D. Strock,
Horse Rakes,
No. 3,213 Reissued Nov. 24, 1868
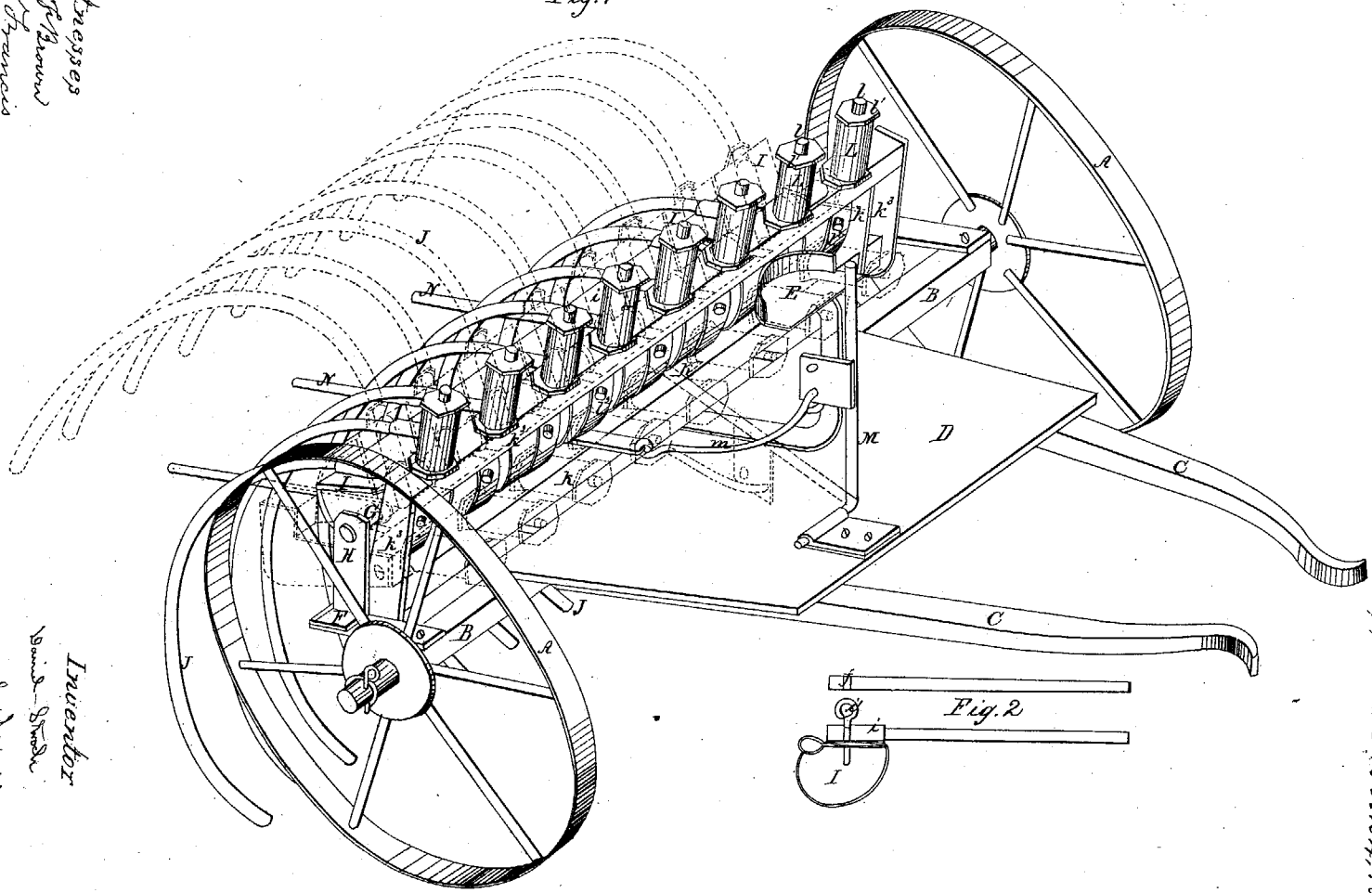
Witnesses
Edw. F. Brown
Geo. Francis
Inventor
Daniel Strock
by his Attorney
Wm. D. Baldwin
N. PETERS, PHOTO-LITHOGRAPHER, WASHINGTON, D. C.

UNITED STATES PATENT OFFICE.

DANIEL STROCK, OF CHAMBERSBURG, PENNSYLVANIA.

IMPROVEMENT IN HORSE-RAKES.

*Specification forming part of Letters Patent No.* 30,010, *dated September* 11, 1860; *reissue No.* 3,213, *dated November* 24, 1868.

*To all whom it may concern:*

Be it known that I, DANIEL STROCK, of Chambersburg, in the county of Franklin and State of Pennsylvania, have invented certain new and useful Improvements in Horse-Rakes; and I do hereby declare that the following is a full, clear, and exact description thereof, which will enable those skilled in the art to make and use the same, reference being had to the accompanying drawings, forming part of this specification, in which—

Figure 1 represents in perspective a horse-rake embracing my improvements, the lines showing the relative position of the parts when the crop is being gathered by the rake, while the lines represent the attitude assumed by the raking mechanism when elevated for the purpose of discharging the gavel, or to facilitate the transportation of the machine; and Fig. 2 represents, in perspective, a device for securing the teeth of the rake-head in such manner that they may readily be removed or replaced.

Similar letters of reference indicate corresponding parts.

Horse-rakes may be divided into two classes, the first of which consists of those in which one or more series of teeth are secured upon a rotating shaft, and the second of those in which a single series of teeth, having a vertical reciprocating movement, are attached to a rake-head. This latter class is again susceptible of division into two varieties, in one of which the teeth are all rigidly secured to the rake-head and move with it, while in the other the teeth are arranged upon the rake-head in such manner that each tooth of the series is capable of moving independently both of the rake-head and of its fellows.

The freedom of movement and consequent facility of adaptation to the varying circumstances under which a horse-rake is required to act, possessed by this variety, give it many advantages over the former, and it is to this variety that my improvements are chiefly applicable.

The object of my invention is to provide a cheap, simple, and efficient implement, adapted to the varying wants of the farmer; and my improvement consists in arranging the rake-head and straining-frame (of which latter the pressure-bar forms a part) in such relation to each other that the rake-head shall occupy a position near the center of the straining-frame, the two being united together and rotating upon the same axis, by which arrangement the construction of the machine is simplified and many advantages attained in its operation, as hereinafter more fully set forth.

To accomplish these objects I mount an axle (having thills which support the platform for the driver's seat inserted into it) upon two wheels, which turn on their axle like those of a common cart, which, in fact, this part of the machine very much resembles.

Two horizontal beams extend backward from the axle, one near each wheel, to support two vertical standards in which the rake-head is pivoted. The pressure-bar is suspended from the rake-head by means of radius-bars, which allow it to oscillate freely on its axis. This pressure-bar is suspended in very nearly the same level as the axle of the machine, and forms part of an oblong frame which I call the straining-frame, to the upper bars of which are attached the springs which control the teeth. The rake-head, therefore, forms the center of oscillation of this frame as well as of the pressure-bar.

Rake-teeth of any proper form are inserted into sockets on quadrant-levers (pivoted at their front end to the rake-head,) and held in place by means of a pin inserted into the socket at a right angle to the tooth, which latter can readily be removed from or replaced in its socket by removing the pin.

Upon the top bar of the straining-frame a series of springs formed of short cylinders of india-rubber are placed, there being one for each tooth.

A rod passes down through the center of each cylinder and the top bar of the straining-frame to about the level of the rake-head.

The upper end of each rod is fitted with an adjusting-screw to regulate the strength of the spring, and to its lower end a strap is attached, which passes around the lower part of the quadrant-lever and is secured to the rake-tooth.

The operation of these springs is such that when the strain is thrown upon them as the teeth are elevated in passing over obstacles, the lower ends of the rods come against the protuberant portions of the quadrants, and are drawn down perpendicularly, instead of describing the arc of a circle, as they would if merely pivoted to a point on the front of the quadrant, by which means the resistance of the springs increases more rapidly than would otherwise be the case, and any tendency to bend the rods out of the perpendicular is prevented.

In the accompanying drawings, the machine is represented as mounted upon two wheels, A, turning like those of a cart upon an axle, B, into which thills C are inserted.

A platform, D, rests upon the axle and thills and sustains a seat, E, for the driver.

The raking mechanism is sustained by two horizontal beams F projecting rearward from the axle.

The rake-head G turns freely in bearings in the standards H, which rest upon the beams F.

A series of quadrant-levers, I, are pivoted to the rake-head G, and turn freely upon it.

Each rake-tooth J is inserted into a socket, *i*, as shown in Fig. 2, and held in place by a pin or key, *i'*, passing through a hole in the socket, and a groove or slot, *j*, in the tooth, so placed as always to retain the tooth in its proper vertical plane.

A pressure-bar, K, is suspended from the rake-head G by radius-bars $K^1$, which allow it to swing freely around the rake-head.

This bar K is united at each end to a similar bar, $K^2$, by means of straps $K^3$, the whole forming an oblong frame, K, which I call a straining-frame.

The upper bar $K^2$ of this frame is sustained above and in front of the rake-head, and contains a series of perforations through which connecting-rods *l* pass.

Each rod extends through one of a series of cylindrical rubber springs L, on top of the bar, and is provided with an adjusting-screw, $l^1$, which serves to regulate the tension of the spring.

Each rod *l* is bent at its lower end and connected to a strap or band, $l^2$, which passes under and around one of the quadrants I, and is secured to one of the teeth J.

A lever, M, is pivoted to the floor of the platform within reach of the driver, and is connected by a rod or cord, *m*, to the pressure-bar K.

Clearing-teeth N of the usual form project from the back part of the axle B.

The operation of the machine is as follows: The horse being harnessed to the machine and the parts being in the attitude shown by the lines in Fig. 1, the driver occupies his seat E and starts the horse.

As he advances, the springs L cause the points of the teeth J to conform closely to the undulations or inequalities of the surface of the ground over which they are dragged and in contact with it, and the hay is consequently gathered up by the teeth without the possibility of waste.

When a gavel of sufficient size has been accumulated, the driver grasps the hand-lever M and draws it backward until the parts assume the attitude shown by the lines in Fig. 1.

As the teeth are lifted the hay is stripped from them by the clearers N and falls upon the ground.

The driver then releases his grasp upon the lever and the parts resume their original attitude.

If any one of the teeth should encounter an obstacle in its path, it is free to rise over it (by means of its independent attachment to the rake-head) without elevating the others, and is instantly drawn down again by its springs when the obstacle has been surmounted.

The pressure of each tooth upon the ground may likewise be increased, without affecting that of the others, by means of the adjusting-screws $l^1$.

If the driver desires to increase the pressure upon all the teeth at once he pushes the lever M from him, which draws the pressure-bar K toward him, and this increases the tension of the springs L upon the teeth, without, however, interfering with their rising and falling movements.

This arrangement, it will be seen, is much superior to that of placing the pressure-bar on top of the teeth, for when this is down one tooth cannot pass over an obstruction without lifting the pressure-bar and thus relieving all the other teeth from the pressure.

My method of arranging the rake-head and straining-frame is a very convenient one, and renders the machine much less complex in its construction than it would otherwise be, besides giving the teeth a capacity for being lifted to a greater height and otherwise facilitating the operation of the machine.

My manner of securing the teeth in their sockets is also a great convenience, as they are constantly liable to be broken and have to be removed and replaced by new ones.

This mode of fastening the teeth may be applied to a shank of any other shape with equal simplicity and effect as to that herein described.

What I claim as my invention, and desire to secure by Letters Patent, is—

1. The combination of the rake-head and straining-frame when arranged and operating substantially as described for the purpose set forth.

2. The employment of the rubber or other suitable springs L, adjustable rods $l$, tightening-nuts $l^1$, straps $l^2$, and quadrant-levers I, for holding the rake-teeth and regulating their tension, substantially as and for the purpose described.

3. The combination, with the rake-head G and the rake-teeth, of the quadrant-levers I, substantially as and for the purpose described.

DANIEL STROCK.

Witnesses:
J. E. STAVER,
WALTER STAVER.